US 8,580,875 B2

Nov. 12, 2013

(12) United States Patent
Lee et al.

(10) Patent No.: US 8,580,875 B2
(45) Date of Patent: Nov. 12, 2013

(54) ACRYLIC EMULSION POLYMERS FOR REMOVABLE PRESSURE SENSITIVE ADHESIVE APPLICATIONS

(75) Inventors: Kang I. Lee, Dublin, OH (US); Keith D. King, Columbus, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 456 days.

(21) Appl. No.: 12/001,519

(22) Filed: Dec. 12, 2007

(65) Prior Publication Data

US 2009/0156721 A1 Jun. 18, 2009

(51) Int. Cl.
*C08K 5/00* (2006.01)

(52) U.S. Cl.
USPC .......... 524/211; 524/718; 524/719; 524/720; 524/796; 524/186

(58) Field of Classification Search
USPC ................. 524/507, 718, 719, 720, 796, 186
See application file for complete search history.

(56) References Cited

U.S. PATENT DOCUMENTS

| | | | |
|---|---|---|---|
| 3,951,660 A * | 4/1976 | Hagemann et al. | 430/570 |
| 4,427,744 A * | 1/1984 | Hume, III | 428/462 |
| 4,931,494 A * | 6/1990 | Auchter et al. | 524/460 |
| 4,997,709 A * | 3/1991 | Huddleston et al. | 428/344 |
| 5,416,134 A | 5/1995 | Skoglund | |
| 5,563,205 A * | 10/1996 | Mayer et al. | 524/556 |
| 6,013,722 A * | 1/2000 | Yang et al. | 524/558 |
| 6,194,064 B1 * | 2/2001 | Keely et al. | 428/355 RA |
| 6,194,487 B1 * | 2/2001 | Morimoto et al. | 523/205 |
| 2002/0061945 A1 * | 5/2002 | Oates et al. | 524/167 |
| 2004/0143058 A1 * | 7/2004 | Guo et al. | 524/800 |
| 2005/0032448 A1 * | 2/2005 | Matsumoto et al. | 442/149 |
| 2005/0064125 A1 * | 3/2005 | Tsukida et al. | 428/40.1 |
| 2005/0176876 A1 * | 8/2005 | Lee | 524/556 |
| 2006/0035076 A1 * | 2/2006 | Kim et al. | 428/343 |
| 2006/0084735 A1 * | 4/2006 | Takahashi et al. | 524/271 |
| 2006/0135674 A1 * | 6/2006 | Ishiguro et al. | 524/474 |
| 2006/0135675 A1 * | 6/2006 | Ishiguro et al. | 524/474 |
| 2006/0247367 A1 * | 11/2006 | Guo et al. | 524/556 |

OTHER PUBLICATIONS

International Search Report and Written Opinion, PCT/US08/13422, Ashland Licensing and Intellectual Property LLC.
Form PCT/IB/326 from corresponding PCT application.

\* cited by examiner

*Primary Examiner* — Liam Heincer
*Assistant Examiner* — Michael A Salvitti
(74) *Attorney, Agent, or Firm* — Mark A. Montana

(57) ABSTRACT

An improved aqueous acrylic emulsion pressure sensitive adhesive (PSA) composition of improved sheer strength includes an aqueous acrylic emulsion including at least one hydrophobic monomer, at least one hydrophilic monomer, and at least one hydrogen bonding monomer; and a peel control additive. The PSA composition is substantially devoid of phosphate-based surfactants.

10 Claims, No Drawings

ACRYLIC EMULSION POLYMERS FOR REMOVABLE PRESSURE SENSITIVE ADHESIVE APPLICATIONS

CROSS-REFERENCE TO RELATED APPLICATIONS

None

STATEMENT REGARDING FEDERALLY SPONSORED RESEARCH

Not applicable.

BACKGROUND

The present disclosure relates to pressure sensitive adhesives and more particularly to a water-based pressure sensitive adhesive ("PSA") suitable for high performance applications.

The manufacture of pressure sensitive adhesive tapes is being shifted from organic solvent systems to aqueous latices in order to reduce air pollution and fire hazard, as well as eliminate the rising expense of organic solvents. Pressure sensitive adhesives for high performance application must meet or exceed diverse, often seemingly incompatible, criteria. Initially, the adhesive must coat well on silicone or other release sheets. The adhesive also must exhibit tenacious adherence to film face stock which may serve a masking function or may convey information, e.g. by its imprinting.

When the adhesive coated film face stock is removed from the release sheet, the adhesive must exhibit initial tack and peel performance when pressure-applied to a substrate. The substrate bearing the adhesively-bound film face stock may be subjected to a variety of manufacturing operations over time. Thermal cycling of the substrate is a condition to which high performance, pressure sensitive adhesives must be designed to confront. When the film face stock is removed from the substrate, removal must be clean, i.e. no visible trace of the adhesive should remain on the substrate. Heat aging of the film face stock/substrate laminate, however, tends to cause the adhesive to "build", that is, the necessity to utilize excessive force to remove the film face stock. Thus, the adhesive should stick well initially, but not so well that its later removal is difficult. Then too, the adhesive must possess shelf life, viscosity, etc., making it compatible with existing coating and handling techniques utilized in the art.

More particularly, some commercial acrylic PSA's utilize phosphate-based surfactants as peel control agents (see, for example, U.S. Pat. No. 5,416,134); however, foam control may become an issue with these surfactants. The disclosed PSA replaces such foamy additives with a modification of the acrylic polymer to control peel without foam issues.

BRIEF SUMMARY

An improved aqueous acrylic emulsion pressure sensitive adhesive (PSA) composition of improved sheer strength includes an aqueous acrylic emulsion including at least one hydrophobic monomer, at least one hydrophilic monomer, and at least one hydrogen bonding monomer, and a peel control additive. The PSA composition is substantially devoid of phosphate-based or other surfactants. In the PSA, the hydrophobic monomer content (weight percent) can range from between about 50% and about 98%, and can range from about 70% and about 95%; the hydrophilic monomer content can range from about 1% to about 20%, and can range from about 1% and 10%; the hydrogen bonding monomers can range from about 1% and about 20%, and can range from about 2% and about 10%. The peel control additive can range from about 1% and about 20% of the PSA, and can range from about 2% and about 15%.

Advantages of the present PSA composition include controlled peel strength without sacrificing shear performance. Another advantage is the suppression of foam to improve handling and manufacturing of the present PSA composition.

BRIEF DESCRIPTION OF THE DRAWINGS

There are no drawings.

DETAILED DESCRIPTION

The acrylic emulsion is formulated from at least one hydrophilic monomer, at least one hydrophobic monomer, and at least one monomer capable of hydrogen bonding. The major ingredient in the emulsion copolymer(s) broadly is a $C_4$-$C_{18}$ alkyl(meth)acrylate monomer and advantageously a $C_4$-$C_{12}$ alkyl(meth)acrylate monomer. n-Butyl acrylate and 2-ethylhexyl acrylate are two monomers that have proven advantageous in forming the emulsion copolymer(s) of the present PSA composition, though other straight chain, alicyclic, and cyclic alkyl(meth)acrylate monomers may be used as is necessary, desirable, or convenient. By convention, the parentheticals used herein designate optional content, i.e., (meth)acrylate means "acrylate" or "methacrylate", and the same is true for the parenthetical plurals used herein. Also by convention, copolymer and interpolymer both mean a polymer of two or more monomers. The selection of the terms as used herein is for the clarity of understanding and not by way of limitation.

A combination of acrylamide and ethylenically unsaturated carboxylic acid may be used in the emulsion copolymer(s). The proportion of acrylamide ranges from about 0.1 wt-% to about 5 wt-% while the proportion of unsaturated acid ranges from about 0.2 to about 10% by weight. For present purposes, the acrylamide content includes N-alkyl and other substituted acrylamides and polyamides, e.g. diamides. Cross-linking monomers, e.g., N-methylol acrylamides, may be present in minor amount (e.g., not more than about 15 wt-%), though such latent cross-linking functionality tends to lower tack and initial peel values, thus reducing the strength and suitability of the adhesive composition for some applications. N-methylol substituted acrylamides may be present in the formulation, but such components generate formaldehyde when the films are coated which is a health concern in the industry. Latent cross-linking functionality additionally can cause a loss of adhesive properties of aged unapplied films and labels. Additive cross-linkers cause problems in use with adhesive batch-to-batch consistency, pot life, reactivity, and variation in adhesive performance. Fortuitously, latent cross-linking functionality and additive cross-linkers are not required of the disclosed adhesive composition.

While the acid component simply may be acrylic acid, a variety of additional ethylenically unsaturated carboxylic acids may be useful in forming the emulsion copolymer. Additional acids include, for example, butenoic acids, e.g., crotonic acid, isocrotonic acid, and vinyl acetic acid; an acid from the fumaric acid series, e.g., fumaric acid, maleic acid, glutaconic acid, allyl malonic acid, and allyl succinic acid; and dicarboxylic acids, e.g., itaconic acid. Lower alkyl-substituted (e.g., $C_1$-$C_4$ alkyl group) acrylic acid, e.g., methacrylic acid, additionally can find use in formulating the emulsion copolymer(s) of the present PSA composition. With respect to the ratio of acrylamide to acrylic acid, such ratio broadly ranges from about 1:10 to about 10:1 by weight with about 1:2 being optimum for acrylamide to acrylic acid. This ratio is believed to be important in providing removability characteristics with retention of good initial tack and peel values.

The emulsion copolymer also contains styrene or other aromatic polymerizable monomer, a ($C_4$-$C_{18}$ alkyl)acrylate, vinyl chloride, vinylidene chloride, ethylene vinyl acetate, or other hydrophobic monomer. Styrene can be present in an amount up to about 25% by weight of both copolymers or IPN and preferably about 5% by weight styrene is included in the monomer mixture(s) that is subjected to emulsion copolymerization in accordance with the precepts of the present PSA composition.

Monomers capable for forming hydrogen bonding, for example, include one or more of the following monomers: acrylamide and derivative monomers, such as, for example, acrylamide, diacetone acrylamide, N,N'-dimethacrylamide, N,N'-diethylmethacrylamide, n-tert-octylacrylamide, N-isopropylacrylamide, N-(n-octyldecyl)acrylamide, or N-benzylmethacrylamide; methacrylamide and derivative monomers, such as, for example, methacrylamide, N,N'-dimethylmethacrylamide, N,N'-diphenyl methacrylamide, N-n-dodecylmethacrylamide, or N-ethylmethacrylamide; amine containing acrylamide, such as, for example, N-[3-(N, N'-Dimethylamino)-propyl]acrylamide; amine containing methacrylamides, such as, for example, N-[2-N,N'-dimethylamino-ethyl]methacrylamide or N-[3-(N,N'-dimethylamino)-propyl]methacrylamide; difunctional acrylamide monomers, such as, for example, N,N'-cystaminebisacrylamide, N,N'-ethylenebisacrylamide, N,N'-hexamethylenebisacrylamide, or N,N'-methylenebisacrylamide; dual reactive acrylamide monomers, such as, for example, hydroxymethyldiacetoneacrylamide, N,N'-diallylacrylamide, N-methylolacrylamide, or N-(phthalimidomethyl)acrylamide; dual reactive methacrylamide monomers, such as, for example, N-(2-hydroxypropyl)methacrylamide or N-(iso-butoxymethyl)methacrylamide.

Peel control additives include, for example, one or more of benzoyleneurea, urethane monomer, polyurethane, guanidine, or adipic dihydrazide; and said hydropohilic monomer is one or more of acrylic acid, ($C_1$-$C_4$ alkyl)acrylic acid, crotonic acid, isocrotonic acid, vinyl acetic acid, fumaric acid, maleic acid, glutaconic acid, allyl malonic acid, allyl succinic acid, or itaconic acid, and said hydrophobic monomer is one or more of styrene, vinyl chloride, vinylidene chloride, or ethylene vinyl acetate.

If a blend of copolymers with separate acrylamide and unsaturated acid is used in formulating the novel adhesive composition, then at least one of the copolymers is made by emulsion polymerization techniques, while the other copolymer can be made by emulsion polymerization, solution polymerization, bulk polymerization, suspension polymerization, or other technique [see generally, D. H. Solomon, *The Chemistry of Organic Film Formers*, Robert E. Krieger Publishing Company, Huntington, N.Y. (1977)]. If an IPN is used in formulating the novel adhesive composition, the interpenetrating polymer network can be based either on the acrylamide-containing copolymer or on the unsaturated acid-containing copolymer, though synthesis again is by emulsion polymerization. Details on synthesis of interpenetrating polymer network emulsions can be found in U.S. Pat. No. 4,616, 057, the disclosure of which is expressly incorporated herein by reference.

The emulsion copolymers or IPN can be made by a batch, semi-batch, or continuous process, though preferably a semi-batch process is employed. Despite the ability to meter a constant mixture of the monomers to the reaction vessel, the product emulsion copolymer blend evidences a two-stage morphology, as will be explored further below. Emulsion polymerization in the aqueous continuous phase is conducted in conventional fashion, such as described by D. H. Solomon in *The Chemistry of Organic Film Formers*, pp 294-303, supra. To this end, a conventional emulsifier, e.g. sodium alkylaryl polyethoxy sulfonate or the like, is utilized during the emulsion polymerization reaction. Conventional emulsion polymerization conditions are utilized, though higher non-volatile solids product content may optimize performance, e.g., about 50-65% non-volatile solids of the product emulsion copolymers. The reaction is continued until desirably virtually no acrylamide or other unreacted monomer remains. Any residual unreacted monomer should be removed at the end of the reaction in order that its presence does not degrade performance of the novel adhesive composition. Conventional free radical initiators are used, e.g. hydrogen peroxide, sodium persulfate, potassium persulfate, ammonium persulfate, and like peroxide and persulfate initiators. Conventional reducing agents (e.g., sodium metabisulfate or sodium formaldehyde sulfoxylate) are used as part of the redox initiator systems.

The copolymerization with acrylic acid preferably is run without a buffer at a pH of about 2-3 as determined by the decomposition of the persulfate catalyst (i.e., sulfonic acid generation). Since the pKa of acrylic acid is about 4, the pH of this emulsion reaction mixture should be very low, e.g., much less than 4, so that the acrylic acid copolymer does not ionize and thicken during the reaction. Once the reaction is complete, this copolymer can be basified (i.e. the pH raised with base above pH of reaction) to a pH of above 3, broadly 3-10, and preferably about 8-9. Basification provides a self-thickening adhesive composition and has been determined to enable manufacturing reproducibility of the adhesive composition. For efficiency and economy, aqueous ammonia can be used to basify the composition, though other bases, e.g. various amines, imines, alkali metal and alkaline earth metal hydroxides, carbonates, etc., can be used as is necessary, desirable, or convenient.

In making the emulsion copolymers or IPN, it is a distinct advantage that the emulsion copolymers or IPN need not contain any cross-linking monomers, N-methylol acrylamides, or zwitterionic monomers. These ingredients generally lower tack and initial peel values, thus reducing the strength and suitability of the adhesive contact, especially in high performance applications. Latent cross-linking functionality, additionally, can cause a loss of adhesive properties for aged unapplied films and labels and yellowing or discoloration of the adhesive. Thus, while such ingredients can be included in the emulsion copolymers or IPN in minor amount (e.g., not more than about 15 wt-%), they are not necessary and desirably are avoided.

With respect to performance of the adhesive composition, advantageously, the adhesive is removable from a variety of substrates cleanly, i.e., no visible residue, including, for example, metals (e.g., stainless steel, aluminum, etc.) and plastics (e.g., polyethylene, polypropylene, polystyrene, polycarbonate, ABS resin, PVC resin, etc.) Build on aging generally is less than 100% when the applied adhesive is maintained at 70° C. for three weeks and less than about 50% when aged at room temperature for three weeks. A viscosity of about 1,000-10,000 centipoises is compatible with existing equipment and handling procedures, and preferably a viscosity of about 2,000-4,000 centipoises is maintained. Consistent with the theory expounded above is that testing has revealed that high surface energy polymeric film face stocks provide outstanding performance to the adhesive composition. Surface energy is the product obtained by multiplying surface tension by the two-thirds of the molecular weight and specific volume (e.g., see U.S. Pat. No. 4,529,563). Such face stocks include, for example, plasticized polyvinyl chloride and polyester films. Other film face stocks also are useful including, for example, cellulosics, metal foil, composites, and the like. In this regard, an emulsion copolymer based on 2-ethylhexylacrylate has been determined to retain improved aged adhesive performance on plasticized vinyl facestock.

Conventional additives may be incorporated into the adhesive composition, including, for example, wetting agents, pigments, opacifying agents, anti-foam agents, and the like and mixtures thereof. The adhesives may be applied to one or both sides of the film face stock in a conventional manner, for example, by spraying, knife coating, roller coating, casting, drum coating, dipping, and the like. Indirect application using a transfer process with silicon release paper also can be used. After the adhesive has been applied, the coated film face stock is dried conventionally.

The following examples show how the present PSA composition has been practiced, but should not be construed as limiting. In this application, all percentages and proportions are by weight and all units are in the metric system, unless otherwise expressly indicated. Also, all citations referred to herein are expressly incorporated herein by reference.

Example

In a glass reactor, the pre-emulsion was prepared by sequential additions of water (357 gram), Triton X-200 (153 g, Triton X-200 emulsifier is sodium alkyl aryl polyethoxy sulfonate, 28 wt-% actives, Union Carbide Corporation, Danbury, Conn.), glacial acrylic acid (34 g), styrene (76 g), and butyl acrylate (1572 g), while mixing vigorously with a mechanical stirrer at 500 rpm. The mixture was continuously agitated at 500 rpm for 30 minutes to ensure formation of a stable emulsion. In the reactor equipped with a condenser, a thermocouple, a mechanical stirrer, pre-emulsion inlet tube, water was charged (484 g). The reactor was heated to 70° C. and a solution of sodium bisulfite (1.7 g in 1.3 g of water) was added. Subsequently, a solution of potassium persulfate (0.1 g in 2.2 g of water) was added to the reactor. When the temperature started to increase to 70° C., the pre-emulsion, the potassium persulfate solution (5.2 g in 110 g of water), and the acrylamide solution (34 g in 564 g of water) were charged over the 3-hour period. An observed rising temperature to 80° C. indicated an exothermic reaction.

The polymerization temperature was maintained in the range of 80° C. to 83° C. At the end of pre-emulsion, catalyst, and acrylamide additions, the reactor was heated at 80° C. for 30 minutes. When the reactor was cooled to 60° C., a solution of tert-butyl hydroperoxide (0.7 g in 5 g of water) and a solution of sodium formaldehyde sulfoxylate (0.7 g in 5 g of water) were added at 5 minutes intervals. After 30 minutes of continuous heating at 60° C., the reactor was cooled to room temperature, the polymer was reacted with triethanolamine to reach pH=8. The resulting material was stable emulsion from free of coagulum. The Brookfield viscosity of the resulting emulsion was 2000 cps. After adding copious amounts of wetting agents and peel control additive, the film was cast on the polyester substrate and transferred to the steel substrate. The peel strength was measured. The peel number after 15 minutes' dwell time was found to be 0.39 lb/in and after 24 hrs, the peel number was retained at 0.33 lb/in. The shear strength was found to be >1 hr. under 1"×½"×500 g.

When the acrylamide was replaced with diacetone acrylamide and methacrylamide, similar results were obtained.

While the PSA has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. An improved pressure sensitive adhesive composition (PSA), which comprises: (a) an aqueous acrylic emulsion formulated from at least one hydrophobic monomer, at least one hydrophilic monomer, and at least one hydrogen bonding monomer; and (b) a peel control additive that is benzoyleneurea in an amount of between about 1% and 15% by weight of the PSA composition.

2. The improved PSA of claim 1, wherein said hydrophobic monomer is one or more of an aromatic polymerizable monomer, a ($C_4$-$C_{18}$ alkyl)acrylate, vinyl chloride, vinylidene chloride, or ethylene vinyl acetate.

3. The improved PSA of claim 2, wherein said aromatic polymerizable monomer is one or more of styrene, methylstyrene, butylstryrene, acetoxy styrene, nitrostyrene, or chloromethylstyrene.

4. The improved PSA of claim 1, wherein said hydrophilic monomer is one or more of acrylic acid, a butenoic acid, a fumaric acid, or an ethylenically unsaturated dicarboxylic acid.

5. The improved PSA of claim 4, wherein said hydrophilic monomer is one or more of acrylic acid, ($C_1$-$C_4$ alkyl)acrylic acid, crotonic acid, isocrotonic acid, vinyl acetic acid, fumaric acid, maleic acid, glutaconic acid, allyl malonic acid, allyl succinic acid, itaconic acid, acrylic anhydride, 3-butene-1,2,3-tricarboxylic acid, vinyl benzoic acid, alkene sulfonic acid, or trichloroacrylic acid.

6. The improved PSA of claim 1, wherein said hydrogen bonding monomer comprises acrylamide or acrylamide derivative.

7. The improved PSA of claim 6, wherein said acrylamide or acrylamide derivative is one or more of acrylamide, diacetone acrylamide, N,N'-dimethacrylamide, N,N'-diethylmethacrylamide, n-tert-octylacrylamide, N-iso-propylacrylamide, N-(n-octyldecyl)acrylamide, N-benzylmethacrylamide; methacrylamide, N,N'-dimethylmethacrylamide, N,N'-diphenyl methacrylamide, N-n-dodecylmethacrylamide, or N-ethylmethacrylamide, N-[3-(N,N'-Dimethylamino)-propyl]acrylamide, N-[2-N,N'-dimethylamino-ethyl]methacrylamide N-[3-(N,N'-dimethylamino)-propyl]methacrylamide, N,N'-cystaminebisacrylamide, N,N'-ethylenebisacrylamide, N,N'-hexamethylenebisacrylamide, N,N'-methylenebisacrylamide hydroxymethyldiacetoneacrylamide, N,N'-diallylacrylamide, N-methylolacrylamide, N-(phthalimidomethyl)acrylamide, N-(2-hydroxypropyl)methacrylamide, or N-(iso-butoxymethyl)methacrylamide.

8. The improved PSA of claim 7, said hydrophilic monomer is one or more of acrylic acid, ($C_1$-$C_4$ alkyl)acrylic acid, crotonic acid, isocrotonic acid, vinyl acetic acid, fumaric acid, maleic acid, glutaconic acid, allyl malonic acid, allyl succinic acid, or itaconic acid, and said hydrophobic monomer is one or more of styrene, vinyl chloride, vinylidene chloride, or ethylene vinyl acetate.

9. The improved PSA of claim 1, wherein in said aqueous acrylic emulsion said hydrophobic monomer ranges from about 50% and 98% by weight of the PSA composition, said hydrophilic monomer ranges from about 1% and 20% by weight of the PSA composition, and said hydrogen bonding monomer ranges from about 1% and 20% by weight of the PSA composition.

10. The improved PSA of claim 9, wherein in said aqueous acrylic emulsion said hydrophobic monomer ranges from about 70% and 95% by weight of the PSA composition, said hydrophilic monomer ranges from about 2% and 10% by weight of the PSA composition, and said hydrogen bonding monomer ranges from about 2% and 10% by weight of the PSA composition.

* * * * *